Figure 1:
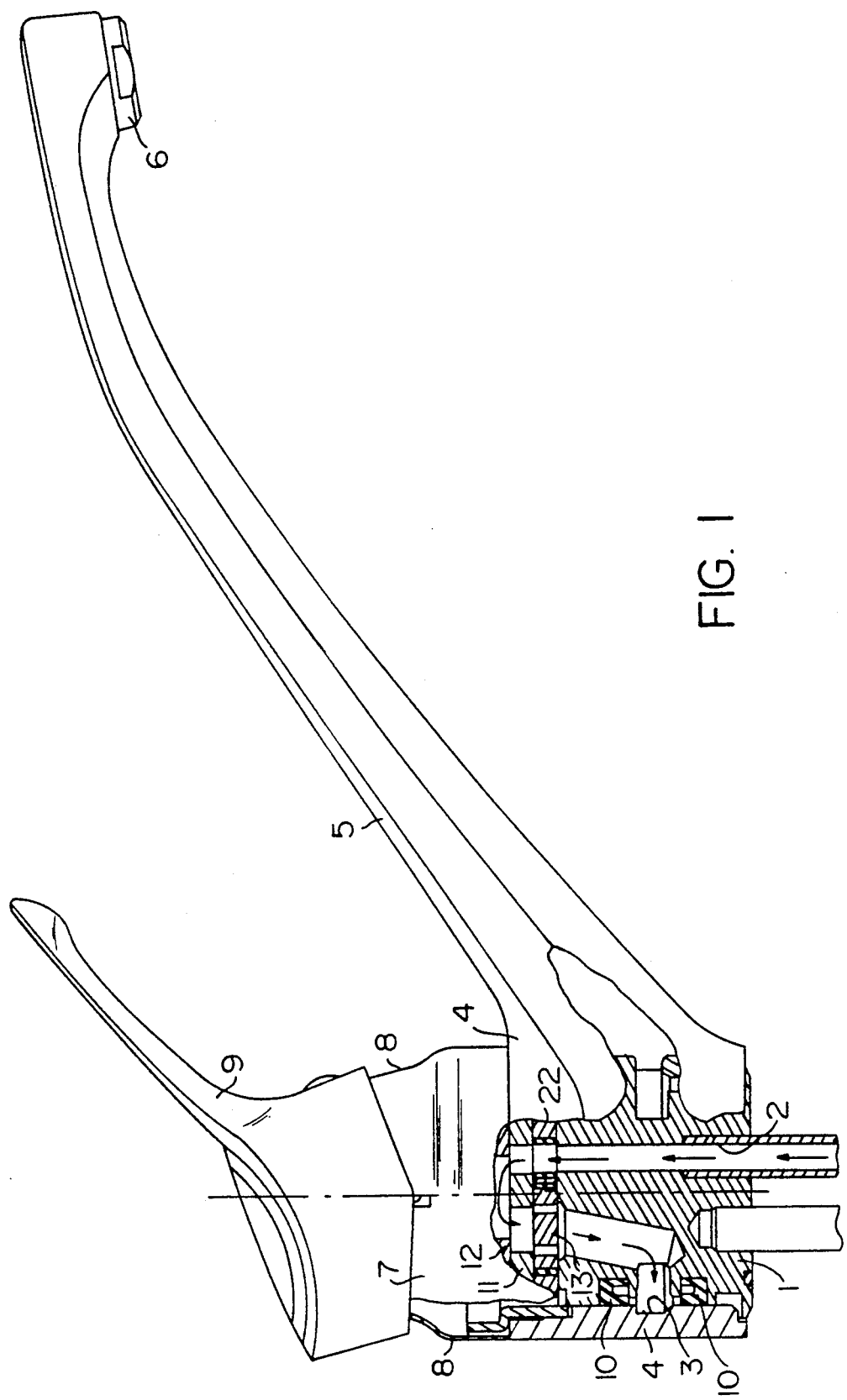

United States Patent [19]

Koch

[11] Patent Number: 5,303,737
[45] Date of Patent: Apr. 19, 1994

[54] SANITARY FITTING

[75] Inventor: Wilhelm Koch, Bongard, Fed. Rep. of Germany

[73] Assignee: American Standard Inc., New York, N.Y.

[21] Appl. No.: 969,839

[22] PCT Filed: Jul. 27, 1991

[86] PCT No.: PCT/EP91/01408
§ 371 Date: Jan. 27, 1993
§ 102(e) Date: Jan. 27, 1993

[87] PCT Pub. No.: WO92/02748
PCT Pub. Date: Feb. 20, 1992

[30] Foreign Application Priority Data

Jul. 28, 1990 [DE] Fed. Rep. of Germany ....... 4023988

[51] Int. Cl.⁵ .................. F16K 11/074; F16K 47/08
[52] U.S. Cl. ............. 137/625.17; 137/625.4; 137/801; 251/127
[58] Field of Search ........... 137/625.17, 625.4, 625.41, 137/801; 251/118, 127

[56] References Cited

U.S. PATENT DOCUMENTS

| | | | |
|---|---|---|---|
| 4,157,099 | 6/1979 | Delker et al. | 251/127 X |
| 4,301,836 | 11/1981 | Hunziker | 251/127 X |
| 4,596,376 | 6/1986 | Knapp | 251/127 |
| 4,624,415 | 11/1986 | Hofstetter, Jr. | 137/801 X |
| 4,632,791 | 12/1986 | Keppel et al. | 264/40.1 |
| 4,838,304 | 6/1989 | Knapp | 251/127 X |
| 4,903,725 | 2/1990 | Ko | 251/127 X |
| 4,960,260 | 10/1990 | McEnearney | 251/127 |

FOREIGN PATENT DOCUMENTS

| | | |
|---|---|---|
| 3336672 | 6/1985 | Fed. Rep. of Germany . |
| 3414838 | 10/1985 | Fed. Rep. of Germany . |
| 8800684 | 3/1988 | Fed. Rep. of Germany . |
| 3639829 | 6/1988 | Fed. Rep. of Germany . |
| 3826235 | 2/1990 | Fed. Rep. of Germany . |
| 1367650 | 6/1964 | France . |
| 2348528 | 11/1977 | France . |

OTHER PUBLICATIONS

Eurodisc 33 891, Friedrich Grohe, Aug. 1987.

Primary Examiner—John Rivell
Attorney, Agent, or Firm—Elaine Brenner Robinson; Ann M. Knab

[57] ABSTRACT

A sanitary fitting comprises a fitting body that can be fixed in place and is provided with an inlet, an outflow channel and an outlet channel. A sleeve with a discharge arm provided with a discharge spout is disposed on the fitting body and connected with the outlet in order to ensure flow therethrough. A valve unit is mounted on the body. Packing rings are disposed adjacent the outlet. In order to technically simplify the use of such a fitting, a flow stabilizer is arranged on the water outlet side of the valve unit in the flow channel.

10 Claims, 2 Drawing Sheets

SANITARY FITTING

This invention concerns a sanitary fitting with a body that can be mounted in a stationary position and has inlet channels, an outflow channel and optionally an outlet channel, with a sleeve that is placed on the body of the fitting and can be pivoted with respect to the body of the fitting, with a pivoting outlet arm—a swivel arm—that is hydrodynamically connected to the outflow channel, is positioned on the sleeve and can be swiveled together with the sleeve and has an outlet mouthpiece and preferably an outlet aerator on the mouthpiece, and with a valve unit, preferably designed as a single-lever cartridge, mounted on the body of the fitting, whereby packing rings designed as lip seals are provided in the area of the outflow channel between the body and the sleeve of the fitting.

Sanitary fittings of the type in question here have long been known. When the outlet arm is designed as a swivel arm, they are especially popular for use in the kitchen area, especially in the form of single-lever, single-hole combination units. With a sanitary fitting known from practice on which this invention is based (see the installation and operating instructions for the sanitary fitting Eurodisc 33,891 from the company Friedrich Grohe Armaturenfabrik GmbH & Co.), two peripheral lip seals are provided between the body of the fitting which is screened into the sink and the sleeve of the fitting, so the seals are arranged above and below an outflow channel running through the sleeve. A valve unit in the form of a single-lever cartridge is mounted in a stationary mount on the body of the fitting by means of mounting bolts. An upper bearing ring is provided between the valve unit and the body of the fitting. A lower bearing ring rests on a lower ring flange of the body of the fitting and projects from there between the body of the fitting and the sleeve of the fitting.

If an outlet aerator is provided on the outlet mouthpieces, it acts as a throttle for the water flow. Flow through the aerator depends greatly on the pressure, however, but this may not be especially pleasant under some circumstances. When the sanitary fitting is operated as a combination unit together with a low-pressure water heater, a pressure reducing valve is needed to throttle the cold water inlet pressure to the low-pressure water heater.

For this reason, appropriate pressure reducing valves are connected to the outlet channel which is then provided. In addition, it has also been found that when washing machines and/or dishwashers are connected to the cold water inlet line, they lead to pressure surges in the cold water inlet line when the solenoid valves used in such appliances close. This presents a great load on the sensitive internal parts of the valve unit and sometimes damages them. Finally, it has been found that the lip seals which permit easy swiveling of the swivel arm undergo such a great deformation at a high internal pressure that the sealing pressure makes it very difficult to move the swivel arm.

This invention is based on the problem of designing and refining the known sanitary fitting described above in such a way that the swiveling outlet arm, referred to as a swivel arm here, can always be pivoted with little exertion of force regardless or essentially regardless of the position of the valve unit.

The sanitary fitting according to this invention is characterized in that a flow stabilizer is provided on the water outlet side of the valve unit, i.e., in the outflow channel in the direction of flow in front of the gaskets and optionally also in the outlet channel. The flow stabilizer which is arranged on the water outlet side of the valve unit according to this invention keeps the flow largely constant in a manner that is largely independent of the pressure, so at any rate the pressure fluctuations on the outflow side are within a very narrow range. This has various consequences. First, an outlet aerator having a very low flow resistance so that it hardly acts as a throttle can now be used. The flow is kept constant by the flow stabilizer regardless of the inlet pressure, specifically in the lower pressure range. When installed in an outlet channel to a low-pressure water heater, the flow stabilizer acts like a pressure reducing valve, which would be necessary there anyway. Pressure surges in the cold water inlet line caused by deactivation of solenoid valves in washing machines or dishwashers can now be largely dissipated by the flow stabilizer, at any rate with an especially appropriate structural design, so the valve unit is no longer damaged by such pressure surges or at least not to such a great extent. Finally, and this is especially important, the flow stabilizer arranged on the water outlet side of the valve unit, i.e., at the start of the outflow channel, leads to the effect that even at a high internal pressure, the packing rings, which are designed as lip seals here, are not exposed to a high pressure. Even when the pressure on the inlet side is high, the swivel arm of a sanitary fitting with this design can be swiveled very easily regardless of the position of the valve unit at the moment, i.e., whether the swivel arm is being moved with pressure in the system or in the absence of pressure.

Preferred embodiments and refinements of the sanitary fitting according to this invention are described in the subclaims.

Figure 2:
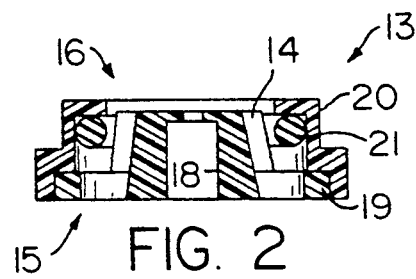
Figure 3:
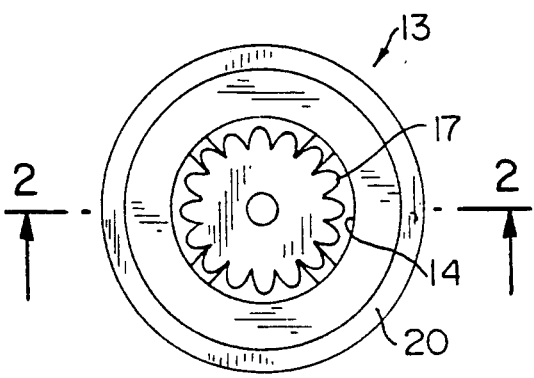

A preferred embodiment of this invention will also be explained in greater detail with reference to the figures, which show the following:

FIG. 1 shows a partially cut-away side view of one embodiment of the sanitary fitting according to this invention with a flow stabilizer on the water outlet side of the valve unit in the outflow channel, FIG. 2 shows the flow stabilizer from FIG. 1 in a sectional view of an enlarged diagram, FIG. 3 shows a flow stabilizer from FIG. 2 as seen from the outlet flow side, also showing the position of the sectional view in FIG. 2.

Figure 4:
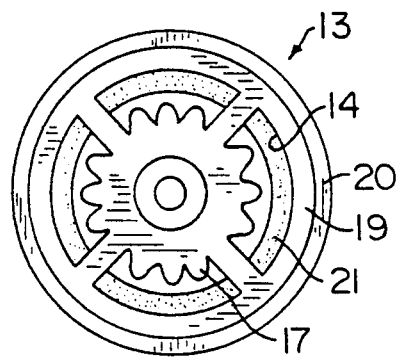

FIG. 4 shows the flow stabilizer from FIG. 2 as seen from the oncoming flow side.

The sanitary fitting illustrated in FIG. 1 is a single-lever, single-hole kitchen sink unit. However, this invention can be implemented not only with such a kitchen unit but in general with all types of sanitary fittings of a similar design. Fitting body 1 which has as usual an inlet channel 2 and a recessed outflow channel 3 that is connected at an inclined angle can be mounted in a stationary position by means of a mounting bolt. Body 1 of the fitting may also have one or more outlet channels, although they are not shown here. Body 1 of the fitting is designed with a cylinder shape here because it also has a sleeve 4 that can be placed on it and swiveled with respect to it and has an outlet arm 5 connected hydrodynamically to outflow channel 3 and having an outlet mouthpiece 6. Outlet mouthpiece 6 has an outlet aerator, although that is not necessary. In the embodiment of a single-lever, single-hole kitchen unit shown here, outlet arm 5 is designed as a swivel arm mounted on sleeve 4 so it can swivel together with sleeve 4. If outlet arm 5 is stationary, swiveling sleeve 4 is not needed.

A valve unit 7, which is designed as a single-lever cartridge in the preferred embodiment shown here, is mounted on body 1 of the fitting. Valve unit 7 is covered by cap 8 next to sleeve 4, which is in turn covered by a rosette designed in one piece with operating lever 9. Sleeve 4 and cap 8 are shown in a cutaway view in the left half of FIG. 1, and valve unit 7 is also partially cut away.

Packing rings 10, which are here designed as lip seals, are provided in the area of outflow channel 3.

At the top of the sectional view a channel guide washer 11 can be seen in the valve unit 7 and above it is the usual control washer 12, which can be moved back and forth with respect to channel guide washer 11 for the purpose of controlling the water flow by means of operating lever 9.

It is essential to this invention that a flow stabilizer 13 is provided on the water outlet side of valve unit 7, i.e., in the outflow channel 3 and/or in the outlet channel, especially at the beginning of the channel. Flow stabilizer 13 can be seen here at the start of outflow channel 3, i.e., directly beneath the channel guide disk 11. The effect that can be achieved with flow stabilizer 13 is described in the general part of the specifications, so reference can be made to that here. In addition, however, it should be pointed out that a flow stabilizer 13 with a corresponding effect may, of course, also be provided in an outlet channel (not shown here). For example, this may be an outlet channel to a low-pressure water heater.

As explained initially, when a corresponding flow stabilizer 13 is used, the outlet aerator may have a very low flow resistance. Then it no longer functions practically as a throttle and the flow is kept constant by flow stabilizer 13.

FIGS. 2 to 4 show a preferred embodiment of flow stabilizer 13. First, it is true here that the flow stabilizer 13 is designed as a disk and has an axial ring-shaped flow channel 14, in which case the diameter of the ring of the flow channel 14, decreases from the incoming flow side 15 to the outgoing flow side 16. In the embodiment illustrated here, the flow can be kept constant by virtue of the fact that flow channel 14 is provided with internal baffle-like elements 17. These internal elements 17 are designed in the form of a rosette. FIG. 2 in combination with FIGS. 3 and 4 shows an especially preferred embodiment, which is characterized in that flow stabilizer 13 has a central passage 18 in addition to the annular flow channel 14 whereby this central passage has a diameter that decreases gradually in stages from the oncoming flow side 15 to the outlet flow side 16. Passage 18 normally causes little interference with respect to the flow in flow channel 14. At any rate, the property of maintaining a constant flow is slightly impaired by central passage 18. However, this is only a slight influence quantitatively. On the other hand, passage 18, especially with the graduated diameter, has the positive effect of diminishing pressure surges in the cold water inlet line in the buffer volume formed by passage 18 to such an extent that they no longer have a negative effect on valve unit 7. A sudden increase in pressure can be dissipated rapidly in the buffer volume, and then the area of passage 18 having a smaller diameter serves to relieve the buffer volume. Furthermore, FIGS. 2 to 4 show that flow stabilizer 13 consists of two disks 19 and 20 joined together with a packing ring 21 between them.

The design of flow stabilizer 13 shown in FIGS. 2 to 4 is very advantageous, especially when made of plastic, as shown here.

Finally, as FIG. 1 shows, the design here is selected so that flow stabilizer 13 is integrated into valve unit 7 and is arranged there in a separate installation disk 22. This corresponds to the basic design of the preferred valve unit 7 provided here.

I claim:

1. A sanitary fitting that can be mounted in a stationary mount comprising:
   inlet channels;
   an outflow channel;
   a fitting body having an outlet channel;
   a sleeve disposed on said fitting body, said sleeve having swiveling capabilities;
   an outlet arm hydrodynamically connected to said outflow channel, said outlet arm mounted on said sleeve and having swiveling capabilities;
   an outlet mouthpiece disposed at the end of said outlet arm,
   a valve unit mounted on said fitting body;
   packing rings disposed adjacent said outflow channel and between said body and said sleeve; and
   a flow stabilizer disposed in said outflow channel in the direction of flow in front of said packing rings, said flow stabilizer having an incoming flow side and an outlet flow side.

2. The sanitary fitting as claimed in claim 1, wherein said mouthpiece is an outlet aerator.

3. The sanitary fitting as claimed in claim 2, wherein said valve unit is a single-lever cartridge.

4. The sanitary fitting as claimed in claim 3, wherein said flow stabilizer is disposed in said outlet channel.

5. The sanitary fitting as claimed in claim 4, wherein said outlet aerator is a low flow resistant aerator.

6. The sanitary fitting as claimed in claim 5, wherein said flow stabilizer comprises a disk having an axial ring-shaped flow channel, said flow channel having a ring diameter decreasing from the incoming flow side to the outlet flow side of said stabilizer.

7. The sanitary fitting as claimed in claim 6, wherein said flow channel comprises a plurality of baffles which in combination, form a rosette.

8. The sanitary fitting as claimed in claim 7, wherein said flow stabilizer further comprises a central passage having a diameter that decreases from the incoming flow side to the outlet flow side of said stabilizer.

9. The sanitary fitting as claimed in claim 8, wherein said flow stabilizer comprises two disks joined together, said disks having a packing ring between them.

10. The sanitary fitting as claimed in claim 9, wherein said flow stabilizer is disposed in a separate installation disk, said installation disk disposed in said valve unit.

* * * * *